Jan. 14, 1969  E. SNITZER ET AL  3,422,025

GLASS LASERABLE MATERIAL

Filed Nov. 10, 1964

INVENTORS
ELIAS SNITZER
ROBERT W. YOUNG
BY RICHARD F. WOODCOCK

John A. Harvey
ATTORNEY

United States Patent Office 3,422,025
Patented Jan. 14, 1969

3,422,025
GLASS LASERABLE MATERIAL
Elias Snitzer, Sturbridge, Mass., and Robert W. Young, Woodstock, and Richard F. Woodcock, South Woodstock, Conn., assignors, by mesne assignments, to American Optical Company, Southbridge, Mass., a corporation of Delaware
Filed Nov. 10, 1964, Ser. No. 410,209
U.S. Cl. 252—301.6    4 Claims
Int. Cl. C09k 1/04

ABSTRACT OF THE DISCLOSURE

Laserable materials including a glassy host material with a sufficient quantity of a fluorescent material therein to support in the host material a sufficient inversion in population to provide enough energy by stimulated emission to overcome light energy losses in the host are known. Examples are given in the co-pending application of Elias Snitzer, Ser. No. 168,012, filed Jan. 16, 1962, and assigned to the same assignee as the present application.

Figure 2:
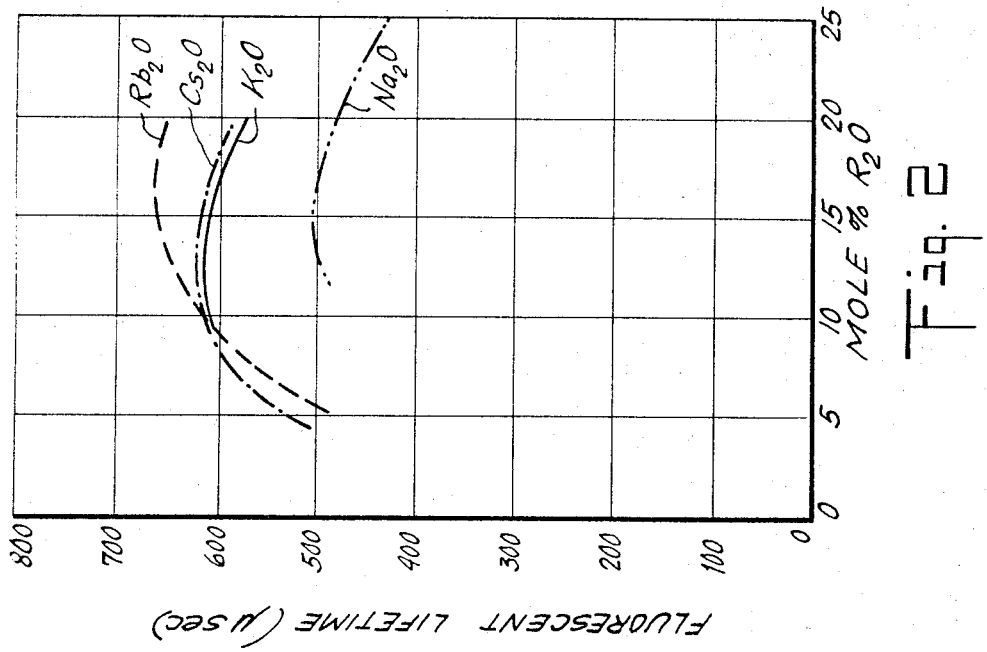

Where a selected glass is used as a host material, the inclusion of a quantity of heavier monovalent, potassium, cesium, or rubidium ions or combinations thereof for a portion of the lighter sodium ions contained in such glass and a quantity of heavier divalent ions such as cadmium, lead or one or more ions selected from the alkali earth group increases the fluorescent lifetime of the laserable material and permits the addition of larger quantities of the activated material before quenching occurs. Furthermore, increased ease of operation as a 4-level energy system is attained.

---

The present invention relates to laserable materials suitable for fabrication of laser elements or components and, more particularly, to such materials having non-crystalline atomic structure with the numerous known advantages attendant thereto. In greater particularity, the invention relates to laserable materials of a silicate glass type and which incorporate heavy monovalent alkali ions for improved fluorescent lifetimes.

A neodymium-containing laserable material of non-crystalline atomic structure possesses numerous virtues in the fabrication of laser elements or components, and the latter exhibit many well known desirable operational characteristics. In many laser applications, it is desirable that a large amount of energy be stored in the form of excited ion states. The lifetime for fluorescent emission plays a significant role in the amount of energy storage which may be attained in a given volume of laserable material, and any increase of lifetime is therefore highly beneficial for increased energy storage. Maximized energy storage is particularly desirable in so-called Q-switching resonant laser structures or where large-amplitude relaxation oscillations are to be generated.

The Q of a laser resonant cavity structure is a measure of the ratio of energy storage to energy dissipation per light cycle. Q-switching may be accomplished by a control device interposed in, or terminating an end of, a light propagation path extending through the laser element. The control device is so operated as normally to establish a low value of Q in the resonant cavity until laser action is desired, after which the control device quickly increases the value of Q to permit the stored energy of the laser element to be rapidly extracted as light energy emission. The amount of energy storage is related to the difference between the number (i.e., "population") of excited ions in an upper energy level and the number or population of unexcited ions present in or remaining at a lower energy level. When the population of the upper energy level exceeds that of the lower energy level upon which an emissive transition terminates, an operative condition conveniently referred to as a population inversion prevails. The minimum value of population inversion M required for laser action to begin is expressed by the relation:

$$M \alpha \tau / Q \tag{1}$$

where $\tau$ is the radiative lifetime of the fluorescing ion.

Radiative lifetime may be expressed as the reciprocal of the probability of radiative transition from an excited level to a lower energy level within one unit of time. It will be evident from the relation just expressed that, for a given value of $\tau$, decreasing the value of Q enables more energy to be stored in the inverted ions of a given volume of the laserable material before laser action can begin; and further that the quantity of energy which can be stored, for any value of Q, is increased by increasing the fluorescent lifetime $\tau$. When the laserable material is irradiated with light energy of appropriate wavelength, each ion which absorbs a photon of light energy is excited from a lower to a higher energy level and then usually experiences a non-radiative transition to an intermediate energy level where the net resultant energy remains stored in the excited ion. The total energy that can be stored in intermediate energy-level excited ions is roughly proportional to the photonic energy absorbed in a time equal to the fluorescent lifetime of the laserable material. While the total stored energy can thus be increased by increase of the intensity of the radiating light energy, the maximum intensity of conventional light sources is limited for well known reasons. Prolonged duration in the application of the irradiating light energy to the laserable material is of no avail in increasing the energy storage for the reason that the fluorescent lifetime establishes a limit on the maximum energy which can be stored before laser action begins as noted above. Accordingly, any increase of fluorescent lifetime of the laserable material contributes an important increase in the amount of energy storage obtainable from conventional irradiation light sources.

It is an object of the present invention to provide a new and improved laserable material suitable for fabrication of laser elements or components.

It is a further object of the invention to provide an improved laserable material exhibiting an increased lifetime for fluorescent emission with consequent improvement of the energy storage capacity per unit volume of the material.

It is an additional object of the invention to provide a laserable material enabling an increase in the concentration of excited ions before concentration quenching begins to have significant effect, and thus one enabling attainment of lower thresholds and higher efficiency for laser action to prevail.

It is yet a further object of the invention to provide a novel laserable material possessing the desirable characteristics just enumerated yet one operable with the desirably high efficiency of a four-level energy-state system.

It is an additional object of the invention to provide an improved laserable material having trivalent neodymium providing a source of active ions and dispersed in a host material of non-crystalline atomic structure.

Figure 1:
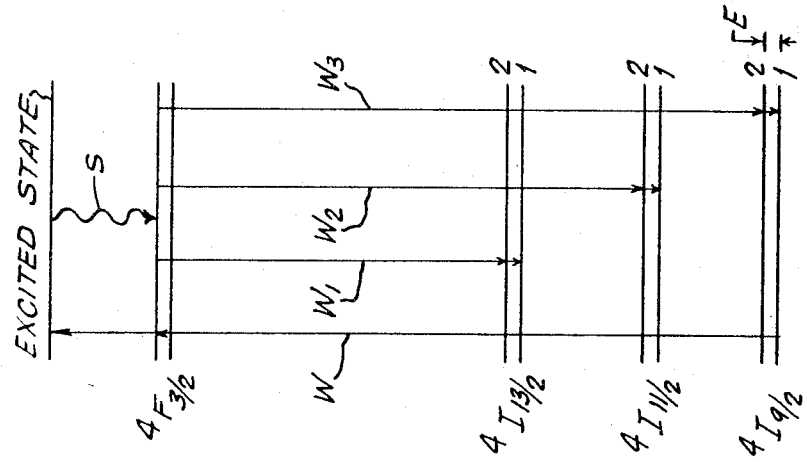

Other objects and advantages of the invention will appear as the detailed description proceeds in the light of the accompanying drawing in which:

FIG. 1 represents an energy level diagram used in explaining a desirable operational characteristic attainable by a laserable material embodying the present invention, and FIG. 2 graphically represents the optimized values of fluorescent lifetime for various molar percentages of individual monovalent alkali ions which may be used in accordance with the invention.

Applicants have discovered that the fluorescent lifetime τ of a silicate glass containing an active laser ingredient is substantially increased by use of the heavier alkali monovalent ions and the heavier divalent ions such as cadmium or lead or one or more selected from the alkaline earth group. For example, fluorescent lifetimes in excess of 825 microseconds or better have been attained in trivalent neodymium doped silicate glasses containing potassium, rubidium or cesium and mixtures thereof as compared to fluorescent lifetimes of approximately 550 microseconds in prior trivalent neodymium doped glasses using sodium as the alkali ion.

In addition to this increase of fluorescent lifetime attained by the present invention, two incidental benefits are obtained. One of these is that with increasingly heavier alkali ions the concentration of trivalent neodymium ions (i.e., an increase in the number of ions per cubic centimeter of the laser material) may be significantly increased before the appearance of concentration quenching begins to be evident. For example, concentration quenching in a silicate glass containing monovalent potassium as the alkali ion takes place at approximately 2.5 weight percent of $Nd_2O_3$ whereas by substituting monovalent rubidium for the potassium ion approximately 5 weight percent of $Nd_2O_3$ may be used before concentration quenching sets in. The second incidental benefit concerns the increased ease with which operation of the laserable material as a 4-level energy system is attained. Referring to the energy level diagram of FIG. 1 applicable to a trivalent neodymium doped silicate glass, absorption of pumping photonic light energy from the $^4I_{9/2}$ level to a typical excited state level is represented by the arrow W. Non-radiative transitions represented by the wavy-line arrow S carry the ion to the $^4F_{3/2}$ energy state from which fluorescence originates when the ion emits a quanta of light in going to either the $^4I_{13/2}$, $^4I_{11/2}$, or $^4I_{9/2}$ state as represented by the respective arrows $W_1$, $W_2$ and $W_3$. Depending on the glass composition, these three emissions may either appear as broad bands or they may each appear as double lines. For the compositions that give double lines, each of the three $^4I$ states can be considered to be split into two states. When such a splitting occurs, it is possible to obtain laser action for the transition that terminates in the $^4I_{9/2}$ (2) level. For such an application, it is desirable to have the splitting, E, as large as possible to gain the benefits of a 4-level system. The use of heavy monovalent alkali ions and heavy divalent ions facilitate attaining this desirable 4-level energy system with its well-known advantages. For example, a value of E of 450 cm.$^{-1}$ has been attained in a silicate glass by use of rubidium as the monovalent alkali ion and barium as the divalent ion in accordance with the present invention.

With respect to the divalent ions, which are essential in silicate glasses to promote their stability, applicants have discovered that an increase in their concentration tends to reduce the fluorescent lifetime but the heavier divalent ions such as lead, cadmium, barium or strontium have been found by applicants to have a lesser effect in this respect as compared to the lighter divalent ions such as calcium. Barium has been found to be especially desirable in attaining increased fluorescent lifetimes while promoting stability in silicate glasses, and trivalent neodymium doped silicate glasses having long fluorescent lifetimes may include BaO within the range of 0–10 mol percent and desirably include approximately 5 weight percent of BaO. A range of 0–10 mol percentage is suitable for others of the heavier divalent ions useful in the glass composition.

The monovalent alkali promote longest fluorescent lifetimes in a silicate glass incorporation an active laser ingredient when the mol ratio of the alkali oxide to the silicon oxide is approximately 1/6. This ratio represents approximately 20 weight percent of alkali oxide, a percentage which promotes the objects of the invention without significantly decreasing the glass durability or unduly increasing its coefficient of expansion. FIG. 2 graphically shows the substantial improvement in fluorescent lifetime when the heavier monovalent potassium ion replaces the lighter monovalent sodium ion in a silicate glass, and the further improvement in fluorescent lifetime when the even heavier monovalent cesium and rubidium ions are employed. FIG. 2 also shows that in silicate glass compositions containing more than approximately 10 mol percent of alkali, a given molar percentage of $Rb_2O$ is superior than the same molar percentage of $Cs_2O$ which in turn in better than the same molar percentage of $K_2O$ insofar as an increase of the fluorescent lifetime is concerned. On the other hand, silicate glass compositions containing less than 10 mol percent of alkali attain an increased fluorescent lifetime for a given molar percentage of $Cs_2O$ or $K_2O$ as compared to the same molar percentage of $Rb_2O$. The fluorescent lifetime may be increased even more by employing mixtures of the heavier monovalent ions. For example, a fluorescent lifetime of 830 to 850 microseconds was attained for glasses containing equal parts by weight of $K_2O$ and $Rb_2O$, while a similar lifetime has been attained by use of equal parts by weight of $K_2O$ and $Cs_2O$, both cmopositions having a total alkali level in a silicate glass of 20 weight percent. From the standpoint of maximizing the fluorescent lifetime of a laser component, it would be desirable to have all of the alkali provided by use of cesium or rubidium in relatively large weight percentages of the order of 20%.

The active laser ingredient in the glass composition may be provided within a range of weight percentages and by use of numerous lanthanide and actinide elements as more fully disclosed in the aforementioned copending application of Elias Snitzer, Ser. No. 168, 012, filed Jan. 16, 1962. In particular, the active laser ingredient may have a weight percentage within the range of approximately 0.01% and 30% of the weight of the glass and the laser ingredient may be selected from the group including neodymium$^{+++}$, erbium$^{+++}$, samarium$^{++}$, samarium$^{+++}$, thulium$^{+++}$, uranium$^{+++}$, europium$^{++}$, europium$^{+++}$, praseodymium$^{+++}$, terbium$^{+++}$, holmium$^{+++}$, typrosium$^{+++}$, ytterbium$^{+++}$, and cerium$^{+++}$, and mixtures thereof.

A typical ribidium-neodymium glass composition having a fluorescent lifetime of 860 microseconds, a power threshold of approximately 200 watt seconds, an index of refraction of 1.501 at 0.589 micron wavelength and 1.492 at 1.060 micron wavelength, as measured by use of a ¼″ x 2½″ ground cylindrical laser rod fabricated from this glass composition and excited with a light pumping source comprised by a type FT524 (or helical) flash tube has the following batch composition:

| | Units of wt. |
|---|---|
| $SiO_2$ | 276.00 |
| $Rb_2CO_3$ | 49.60 |
| $K_2CO_3$ | 47.04 |
| $KNO_3$ | 17.20 |
| $Ba(NO_3)_2$ | 34.00 |
| $Sb_2O_3$ | 4.00 |
| $Nd_2O_3$ | 20.00 |

The percent oxide composition as calculated from this batch would be as follows:

| | Wt. percent | Ion percent | Mol percent |
|---|---|---|---|
| $SiO_2$ | 69 | 74.7 | 84.5 |
| $K_2O$ | 10 | 13.8 | 7.8 |
| $Rb_2O$ | 10 | 7.0 | 3.9 |
| $BaO$ | 5 | 2.1 | 2.4 |
| $Sb_2O_3$ | 1 | 1.9 | 0.3 |
| $Nd_2O_3$ | 5 | 0.5 | 1.1 |

The glass making raw materials listed in the foregoing glass composition must be of high purity, and in particular they must be free of contamination by iron or other elements which would cause light absorption at 1.06 micron wavelength if they were present in the finished glass. The silica, for example, should not contain more than 5 parts per million of iron as $Fe_2O_3$ while the other raw materials, used in smaller quantities in the batch, should not contain more than 8–10 parts per million of iron as $Fe_2O_3$. This laser glass may be prepared by fusing the raw materials in a platinum crucible heated in a "Globar" electric furnace. No special atmosphere is necessary in the furnace. The raw materials are mixed intimately and completely in a mixing device that does not introduce any contamination. The mixed batch is loaded into the platinum crucible, or a high purity ceramic crucible which will not contaminate the melt by introducing iron or any other element which will absorb light at 1.06 micron wavelength if present in the finished glass. The crucible should be at a temperature of approximately 2700° F. when the raw material is charged, the loading operation taking approximately two hours since the level in the crucible drops as the batch materials fuse together to form the glass and thus require the addition of more batch. When the charging of the batch is completed, the temperature of the melt is raised to approximately 2800° F. and held at this level until the melt is free of bubbles. The molten glass is then stirred at this temperature for at least one hour to free the melt of striae. The temperature of the glass is then lowered to approximately 2700° F. where it is maintained for a period of about one hour before casting. The temperature value last recited is suitable for a melt of about 1 lb. but it will be understood that the preferred temperature at casting is a function of the size of the cast with larger casts requiring lower temperatures for control of the glass. The glass may be cast in a cast iron mold, and is transferred to an annealing oven just as soon as it has cooled enough to maintain its shape. The glass is annealed at a temperature of 1100° F. for a period of one hour and is then cooled down slowly overnight to room temperature.

It will be apparent from the foregoing description of the invention that a laserable material embodying the invention is characterized by substantially improved values of fluorescent lifetime, and thus exhibits improved energy storage capacity per unit volume of material. A laserable material embodying the invention possesses the further advantage that it permits an increase in the percentage of the active laser ingredient before concentration quenching begins to have significant effect, and thus enables attainment of lower thresholds and higher efficiency for laser action to prevail. The laserable material of the invention also may more readily attain the desirable high operational efficiency of a 4-level energy state atomic system.

While there have been described specific forms of the invention for purposes of illustration, it is contemplated that numerous changes may be made without departing from the spirit of the invention.

What is claimed is:
1. A laserable material consisting essentially of a silicate glass containing a divalent metal oxide content within the range of approximately 0–10 mol percent, wherein the metal is selected from the group consisting of cadmium, lead and the alkali earths, a monovalent alkali oxide content within the range of approximately 7–20 mol percent wherein a monovalent alkali ion selected from the group consisting of potassium, rubidium, cesium and mixtures thereof make up the monovalent alkali oxide content, and trivalent neodymium within the range of approximately 0.01–30 weight percent.

2. A laserable material consisting essentially of a silicate glass containing a divalent metal oxide content within the range of approximately 0–10 weight percent, wherein the metal is selected from the group consisting of cadmium, lead and the alkali earths, a monovalent alkali oxide content of approximately 20 weight percent and made up of equal parts by weight of potassium oxide and rubidium oxide, and 5–7 weight percent of $Nd_2O_3$.

3. A laserable material consisting essentially of a silicate glass containing a divalent metal oxide content within the range of approximately 0–10 weight percent, wherein the metal is selected from the group consisting of cadmium, lead and the alkali earths, a monovalent alkali oxide content of approximately 20 weight percent and made up of equal parts by weight of potassium oxide and cesium oxide, and 5 weight percent of $Nd_2O_3$.

4. A laserable material consisting essentially of a silicate glass containing a barium oxide content of approximately 5 mol percent, a monovalent alkali oxide content of approximately 15 mol percent and made up of a monovalent alkali ion selected from the group consisting of potassium, rubidium, cesium and mixtures thereof, and a neodymium oxide content of approximately 1.1 mol percent.

References Cited

UNITED STATES PATENTS

| | | | |
|---|---|---|---|
| 2,097,275 | 10/1937 | Fischer | 252—301.4 |
| 2,099,602 | 11/1937 | Fischer | 252—301.4 |
| 2,805,166 | 9/1957 | Loffler | 106—52 |
| 3,032,429 | 5/1962 | Arthur | 106—52 |
| 3,174,938 | 3/1965 | Soden et al. | 252—301.5 |
| 3,177,155 | 4/1965 | Soden et al. | 252—301.5 |
| 3,203,902 | 8/1965 | Soden et al. | 252—301.5 |
| 3,270,290 | 8/1966 | Maurer | 252—301.4 |

TOBIAS E. LEVOW, *Primary Examiner.*

ROBERT D. EDMONDS, *Assistant Examiner.*

U.S. Cl. X.R.

106—52; 252—301.4